March 11, 1930.  W. S. BAKER  1,750,381
PISTON RING
Filed July 26, 1927
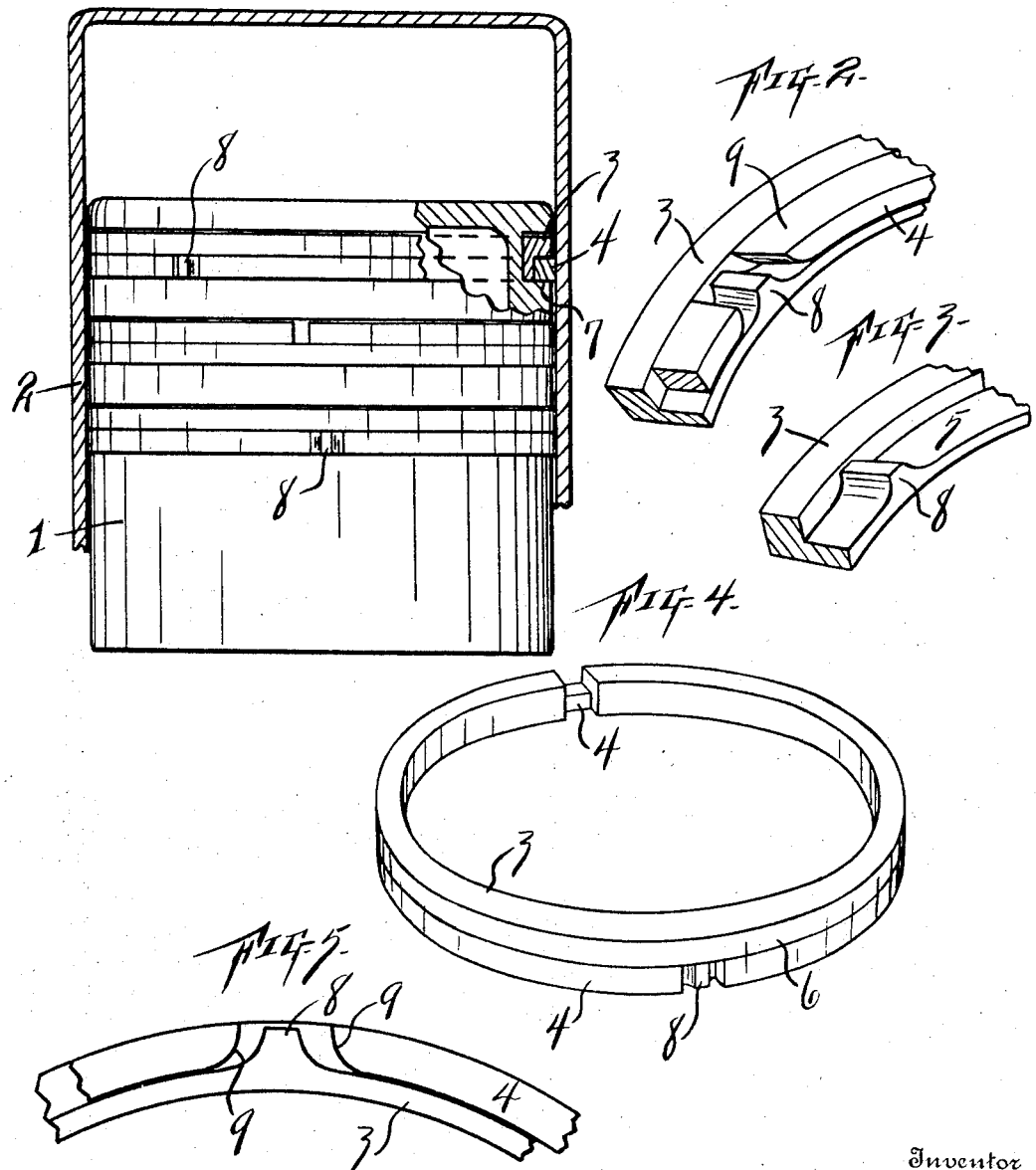
Inventor
WM. S. BAKER
By A. D. Jackson
Attorney Patented Mar. 11, 1930

1,750,381

UNITED STATES PATENT OFFICE

WILLIAM S. BAKER, OF FORT WORTH, TEXAS, ASSIGNOR TO ILLINOIS PISTON AND RING COMPANY, OF FORT WORTH, TEXAS, A CORPORATION OF ILLINOIS

PISTON RING

Application filed July 26, 1927. Serial No. 208,510.

My invention relates to piston rings and more particularly to piston rings for various types of internal combustion engines; and the object is to provide piston rings which afford a double seal in that there is continual contact of the outer periphery of the ring with the cylinder wall and there is continual contact of the lower side of the piston ring with the bottom wall of the groove in the piston. The improved ring is particularly essential in rings for cylinders which are large in circumference. Another advantage of this invention is that it remedies defects found in pistons on the market. A further advantage is that the ring is highly efficient in air and gas compressors and pumps. Objects and advantages will be fully explained by the following description and the invention will be more particularly pointed out in the claims.

Reference is had to the accompanying drawings which form a part of this application.

Fig. 1 is a broken section of a piston and piston ring applied thereto.

Fig. 2 is a section in perspective of a composite piston ring.

Fig. 3 is a similar view without the sealing member of the ring.

Fig. 4 is a perspective view of a composite ring.

Fig. 5 is a broken inverted plan view of the same.

Similar characters of reference are used to indicate the same parts throughout the several views.

The drawings show a piston 1 and a cylinder 2. The ring herein set forth is a composite ring, having a body member 3 and a sealing member 4. The body member 3 has an angular cut-out 5 in the lower outer periphery to receive the sealing member 4. Both members are open ring members. The problem to be solved was to provide a composite ring with a continuous sealing surface on its outer periphery to form a seal with the inner wall of the cylinder and to form a continuous sealing surface with some part of the piston which would co-operate with the peripheral sealing surface of the piston to prevent the passage of explosive mixture. The peripheral sealing is accomplished by making the periphery of the sealing member 4 flush with the outer periphery 6 of the body member 3. The sealing with the piston is accomplished by making the edges of both members lie on the bottom wall 7 of the groove in the piston. In this manner the hiatus of the body member 3 (which makes a vacancy on this bottom wall) is closed by the sealing member 4, as shown in Fig. 4. In this arrangement of the two members, the sealing member 4 seals against the inner wall of the piston cylinder and on the bottom wall of the groove in the piston at the same time, thus making a double seal. The hiatus in the sealing member 4 is sealed by the outer periphery 6 of the body member 3 and by the lower edge of the body member, as shown in Figs. 4 and 5 and other views. The members 3 and 4 are connected by ground joints.

Another problem was to provide a stop on the body member 3 to prevent the sealing member 4 from slipping around on the body member 3. The pins heretofore used for this purpose were deficient and were soon broken off. I have provided a stop 8 which is integral with the body member 3 and has the sides concaved as shown in the drawings. This stop 8 is shown as not projecting outwardly flush with the outer periphery, but is intended to be made flush with the outer periphery in rings for certain types of pistons. The ends 9 of the sealing member are curved to conform to the curvatures of the stop member 8.

This form of stop 8 has been found adequate for use on very large piston rings and seems to be the only stop that will answer the purpose in many sizes of rings.

In addition to other functions this integral lug reinforces and strengthens the reduced portion of the inner ring forming a brace for the thinner wall of the ring. This is particularly desirable in a case such as shown where the lug is substantially opposite the gap, as this portion is usually the weakest part of the ring, as against a spreading force, the ring tending to flatten at this point if the ends of the ring be separated to open the gap more. Also the location of this integral lug at this intermediate point tends to cause the ring to spread equally to both sides of the lug.

What I claim, is,—

1. Piston packing comprising an open ring member having a flange at the top edge projecting radially outward and providing a packing or pressure surface on the top thereof, an open ring member mounted on the exterior of said inner member and having the outer surface thereof flush with the outer surface of said flange and having the bottom edge thereof flush with the bottom edge of said inner member, both members being automatically expansible, and a stop integral with the outer surface of said inner ring and with said flange and projecting between the ends of said outer ring.

2. Piston packing comprising an inner ring automatically expansible member provided with an exterior flange projecting radially from the pressure edge thereof forming a pressure surface on the top edge of the ring, an outer open ring automatically expansible member mounted on the exterior of said inner member and having its peripheral pressure surface flush with the outer edge of said flange and having its bottom edge flush with the bottom edge of said inner member and said members being connected by a ground joint, and a radial stop integral with the radial flange and with the vertical portion of said inner ring member and projecting less radially than said flange, said stop having curved sides and projecting between the ends of said outer ring and said outer ring having curved ends conforming to the curvature of said stop.

3. Piston packing comprising a split master ring all of the same piece of stock and an inter-fitting complemental split sealing ring, said master ring at a point removed from the break therein being of approximately the full cross-sectional outline of the two rings combined and having an angular recess extending annularly from opposite sides of said substantially full cross-sectional portion to form an angular seat for the sealing ring blocked at one point by the substantially full cross-sectional portion and the sealing ring fitting in said angular recess with its ends at opposite sides of and opposed to those parts of the full cross-sectional portion blocking said angular recess.

In testimony whereof, I set my hand, this 5th day of July, 1927.

WILLIAM S. BAKER.